US010895758B2

(12) United States Patent
Numata et al.

(10) Patent No.: US 10,895,758 B2
(45) Date of Patent: Jan. 19, 2021

(54) DISPLAY DEVICE (71) Applicant: Japan Display Inc., Minato-ku (JP)

(72) Inventors: Yudai Numata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 192 days.

(21) Appl. No.: 15/912,620

(22) Filed: Mar. 6, 2018

(65) Prior Publication Data
US 2018/0259783 A1 Sep. 13, 2018

(30) Foreign Application Priority Data
Mar. 7, 2017 (JP) ................................. 2017-042669

(51) Int. Cl.
*G02B 27/22* (2018.01)
*G02B 5/30* (2006.01)
(Continued)

(52) U.S. Cl.
CPC ........ *G02B 30/56* (2020.01); *B29D 11/00326* (2013.01); *G02B 5/3025* (2013.01); *G02B 5/3083* (2013.01); *G02B 27/283* (2013.01); *G02F 1/13306* (2013.01); *G02B 5/124* (2013.01); *G02F 1/133514* (2013.01);
(Continued)

(58) Field of Classification Search
CPC .... G02B 30/56; G02B 5/3025; G02B 5/3083; G02B 27/283; G02B 5/124; B29D 11/00326; G02F 1/13306; G02F 1/133514; G02F 2203/02; G02F 2203/12; G02F 2203/50; G02F 2203/62
See application file for complete search history.

(56) References Cited

U.S. PATENT DOCUMENTS 5,519,524 A * 5/1996 Fergason .............. G02F 1/1345
349/149
6,147,805 A * 11/2000 Fergason ........... G02B 27/0172
359/630
(Continued)

FOREIGN PATENT DOCUMENTS

JP 2011-253128 12/2011
JP 2017-032644 2/2017
(Continued)

OTHER PUBLICATIONS

Hecht "Optics, Second Edition" pp. 314-321 (Year: 1987).*
Wikipedia page "Liquid-crystal display" (Year: 2015).*

*Primary Examiner* — George G King
(74) *Attorney, Agent, or Firm* — Oblon, McClelland, Maier & Neustadt, L.L.P.

(57) ABSTRACT

According to one embodiment, a display device includes an optical element including a transmission axis which transmits first linearly polarized light and reflecting second linearly polarized light which crosses the transmission axis, a display unit which emits display light of the second linearly polarized light towards the optical element, a retroreflector including a retroreflective unit which retroreflects reflection light reflected by the optical element, and a non-retroreflective unit, a modulating element including a modulating unit disposed in a position which overlaps the retroreflective unit, and a non-modulating unit disposed in a position which overlaps the non-retroreflective unit.

11 Claims, 8 Drawing Sheets

(51) Int. Cl.
  *G02B 5/124* (2006.01)
  *G02B 30/56* (2020.01)
  *G02F 1/133* (2006.01)
  *B29D 11/00* (2006.01)
  *G02B 27/28* (2006.01)
  *G02F 1/1335* (2006.01)

(52) U.S. Cl.
  CPC ...... *G02F 2203/02* (2013.01); *G02F 2203/12* (2013.01); *G02F 2203/50* (2013.01); *G02F 2203/62* (2013.01)

(56) References Cited

U.S. PATENT DOCUMENTS

| | | | |
|---|---|---|---|
| 2010/0253917 A1* | 10/2010 | Gao | G02B 30/26 353/7 |
| 2015/0248014 A1* | 9/2015 | Powell | G02B 5/124 349/10 |
| 2017/0031157 A1 | 2/2017 | Koito et al. | |
| 2017/0242173 A1 | 8/2017 | Numata et al. | |
| 2017/0285359 A1 | 10/2017 | Numata et al. | |
| 2017/0285402 A1 | 10/2017 | Koito et al. | |
| 2020/0003935 A1* | 1/2020 | Wheatley | G02B 27/286 |
| 2020/0249385 A1* | 8/2020 | Etter | G02B 5/3083 |

FOREIGN PATENT DOCUMENTS

| | | |
|---|---|---|
| JP | 2017-151214 | 8/2017 |
| JP | 2017-181931 | 10/2017 |
| JP | 2017-187598 | 10/2017 |

* cited by examiner

DISPLAY DEVICE

CROSS-REFERENCE TO RELATED APPLICATIONS

This application is based upon and claims the benefit of priority from Japanese Patent Application No. 2017-042669, filed Mar. 7, 2017, the entire contents of which are incorporated herein by reference.

FIELD

Embodiments described herein relate generally to a display device.

BACKGROUND

An imaging device including, for example, a polarizing filter and a retroreflective element has been proposed. In the imaging device, real images, which are display images are formed at a position plane-symmetrical to an emission point of display light showing the images to be displayed with regard to the polarizing filter. Here, the retroreflective prism comprises a flat surface and an uneven rear surface. Of the light entering the retroreflective prism, the light which has approached the rear surface is retroreflected. At this time, the light scattering in the non-retroreflective region in the rear surface is viewed as a ghost, which may cause degradation of display quality.

DETAILED DESCRIPTION

In general, according to one embodiment, a display device comprises an optical element comprising a transmission axis which transmits first linearly polarized light and reflecting second linearly polarized light which crosses the transmission axis, a display unit which emits display light of the second linearly polarized light towards the optical element, a retroreflector comprising a retroreflective unit which retroreflects reflection light reflected by the optical element, and a non-retroreflective unit, a modulating element comprising a modulating unit disposed in a position which overlaps the retroreflective unit, and a non-modulating unit disposed in a position which overlaps the non-retroreflective unit.

According to one embodiment, a display device comprises an optical element comprises a transmission axis which transmits first linearly polarized light and reflecting second linearly polarized light crossing the transmission axis, a display unit which emits display light of the second linearly polarized light toward the optical element, a retroreflective element comprising a plurality of retroreflectors each comprising three reflective surfaces orthogonal to each other and a modulating layer disposed entirely on the reflective surfaces.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

Figure 1:
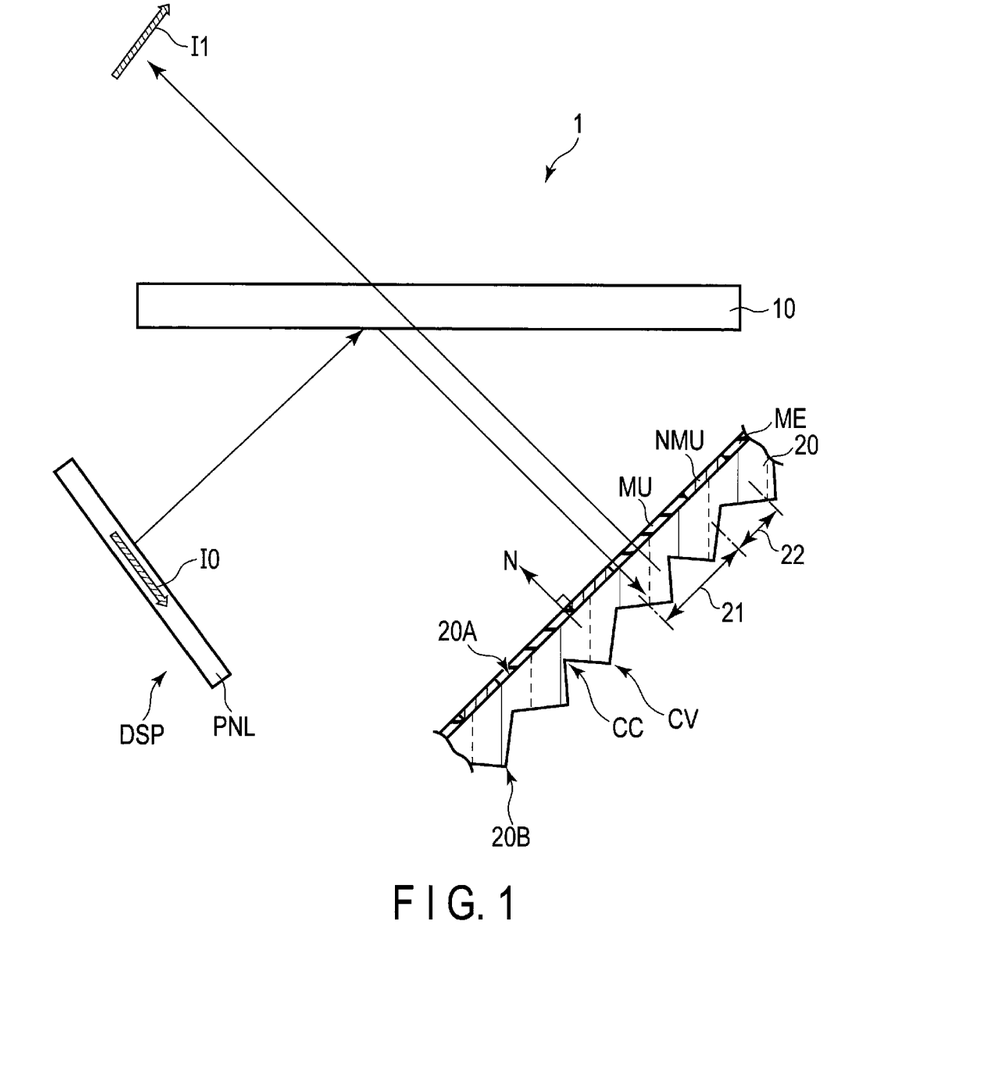
FIG. 1 is a diagram showing a configuration example of a display device of an embodiment.

FIG. 1 is a diagram showing a configuration example of a display device 1 according to an embodiment. That is, the display device 1 comprises an optical element 10, a display DSP, a retroreflective element 20, a modulating element ME and the like. The optical element 10 comprises a transmission axis which transmits first linearly polarized light, and reflects second linearly polarized light which crosses the transmission axis. For example, the first linearly polarized light is a P wave parallel to an incidence surface, and the second linearly polarized light is an S wave perpendicular to the incidence surface. The optical element 10 of such a structure comprises, for example, a wire-grid polarizing filter, a reflective polarizing film, to which a brightness enhancement film is applied, a multi-layered body, on which the reflective polarizing film and a linear polarizer are stacked one another, and the like. When the optical element 10 is formed from by the above-described multi-layered body, the linear polarizer is disposed on a reflective polarizing film, and also comprises a transmission axis parallel to the transmission axis of the reflective polarizing film.

The structure of the display DSP is not particularly limited as long as it is able to emit display light. In this embodiment, the display DSP emits display light of the second linearly polarized light towards the optical element 10. In the example illustrated, the display DSP comprises a display panel PNL. That is, the display panel PNL emits the display light representing a display image I0, and here, the display light is the second linearly polarized light.

For example, the display panel PNL is a liquid crystal display panel which holds a liquid crystal layer between a pair of substrates and comprises a polarizer with a transmission axis which transmits the second linearly polarized light to an emission side of the liquid crystal display panel. But, the display DSP may be a self-luminous display device such as an organic electroluminescent display device, an electronic paper display device comprising an electrophoretic element and the like and a display device employing micro-electromechanical systems (MEMS), or a display device employing electrochromism. The liquid display panel may be of a transmissive type which displays images by selectively transmitting light entering from a light source device, or a reflective type which displays images by selectively reflecting external light or light from a light source device, or a trans-reflective type having the display functions of both the transmissive and reflective types.

The display DSP may comprise, in place of the display panel, a screen on which the light emitted from a projector is projected, or a display medium (such as a poster) illuminated by an illumination device.

The retroreflective element 20 comprises a surface 20A opposing the optical element 10 and a rear surface 20B on an opposite side to the surface 20A. In the example illustrated, the surface 20A is a flat surface. The rear surface 20B is an uneven surface configured from concavities CC and convexities CV. The convexities CV project toward an opposite side to the optical element 10. The retroreflective element 20 comprises, in the rear surface 20B, a retroreflective unit 21 which retroreflects reflection light reflected by the optical element 10, and a non-retroreflective unit 22 which scatters reflection light reflected by the optical element 10 without retroreflecting it.

The retroreflective element 20 is formed, for example, from a resin material. In an interface between the resin material and the air, the retroreflective unit 21 and the non-retroreflective unit 22 are formed. Most of the incident light entering the retroreflective element 20 is retroreflected or scattered in the rear surface 20B without passing through the rear surface 20B.

Note that a reflective film which covers the rear surface 20B may be formed. Here, the reflective film is formed, for example, a light-reflective material such as silver (Ag), aluminium (Al) or an aluminium alloy, to have a uniform thick film. Note that the reflection film may be subjected to a surface treatment to prevent corrosion, or coated with an inorganic material such as silicon nitride (SiN).

The modulating element ME is provided on a surface 20A side of the retroreflective element 20. The modulating element ME comprises a modulating unit MU which imparts a phase difference to transmitted light, and a non-modulating unit NMU which does not impart a phase difference to transmitted light. The modulating unit MU is disposed at a position which overlaps the retroreflective unit 21 along a normal direction N of the surface 20A. Further, the non-modulating unit NMU is disposed at a position which overlaps the non-retroreflective unit 22 along the normal direction N of the surface 20A. The modulating unit MU imparts a phase difference of, for example, about $\lambda/4$ to transmitted light. Here, $\lambda$ is the wavelength of transmitted light.

In case that the modulating element ME is a film, the modulating unit MU is corresponded to a first area of the film, and the non-modulating unit NMU is corresponded to a second area of the film. The first area has a first phase difference and the second area has a second phase difference.

In the example illustrated, the modulating element ME is in contact with the retroreflective element 20, but may be spaced from the surface 20A.

In the figure, an aerial image I1 corresponds to the real image of a display image I0, and is imaged at a position plane-symmetrical with respect to the optical element 10. The light of the aerial image I1 is the first linearly polarized light having passed the optical element 10.

Next, an example of each structural element will be described.

Figure 2:
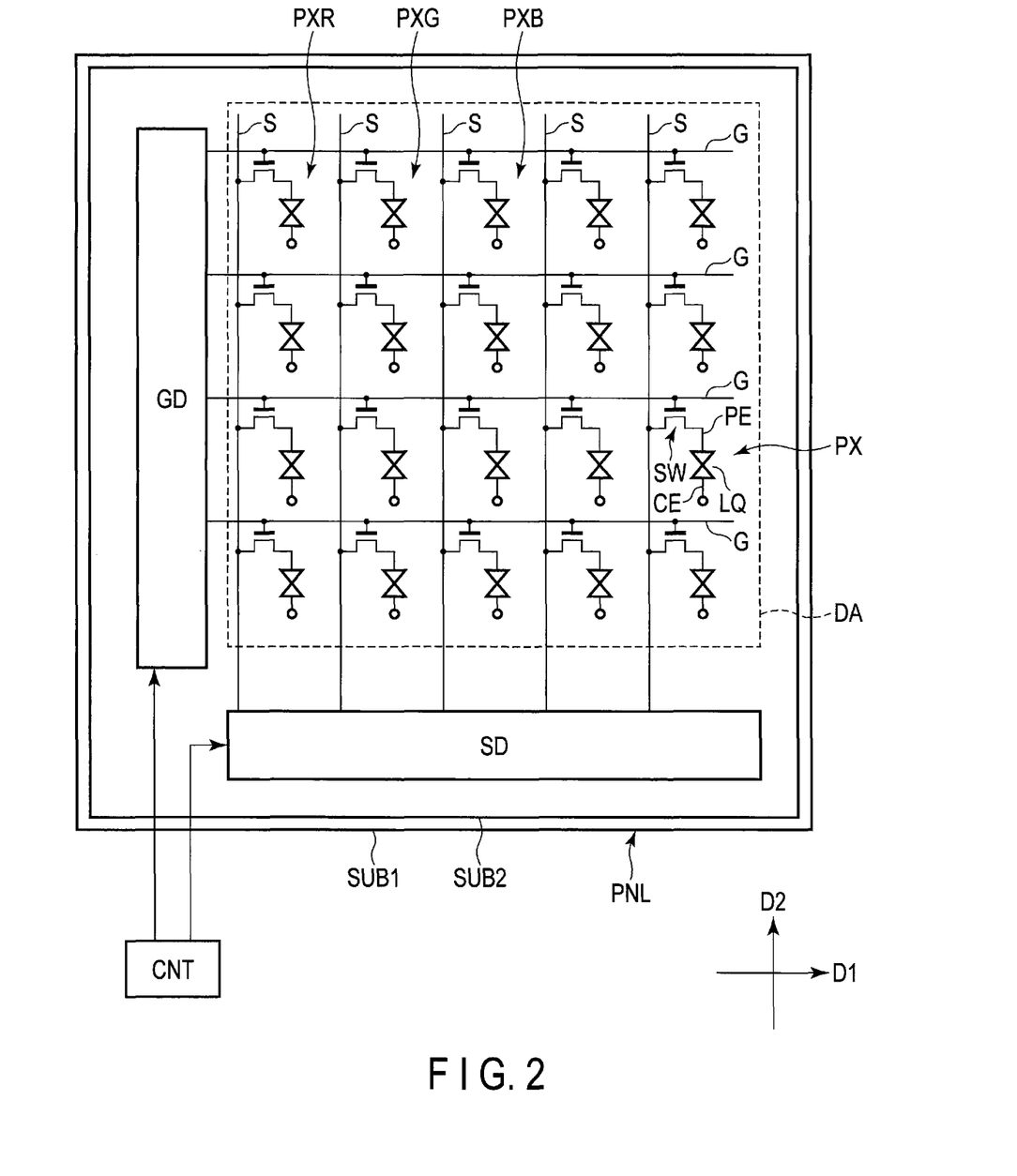
FIG. 2 is a diagram showing a configuration example of the display panel shown in FIG. 1.

FIG. 2 is a diagram showing a configuration example of the display panel PNL shown in FIG. 1. Here, an active matrix-driving transmissive liquid crystal display panel will be described as an example of the display panel PNL. More specifically, the display panel PNL comprises a first substrate SUB1, and a second substrate SUB2 opposing the first substrate SUB1 and a liquid crystal layer LQ held between the first substrate SUB1 and the second substrate SUB2. The first substrate SUB1 and the second substrate SUB2 are attached together while a predetermined cell gap is formed therebetween. The display panel PNL comprises a display area DA which displays images. The display area DA comprises a plurality of subpixels PX arranged in a matrix.

The display area DA comprises, as subpixels PX, for example, a red pixel PXR which displays red, a green pixel PXG which displays green and a blue pixel PXB which displays blue. Note that the display area DA may further comprise a subpixel of a color different from red, green or blue (that is, for example, a white pixel which displays white). The pixels which realize color presentation comprises subpixels PX of these plurality of different colors. That is, a pixel discussed here is the minimum unit which forms a color image. In the example illustrated, the pixels each comprise a red pixel PXR, a green pixel PXG and a blue pixel PXB.

The red pixel PXR comprises a red color filter and is formed to be transmissive mainly to red light of the white light from the light source device. The green pixel PXG comprises a green color filter and is formed to be transmissive mainly to green light of the white light from the light source device. The blue pixel PXB comprises a blue color filter and is formed to be transmissive mainly to blue light of the white light from the light source device. Although will not be explained in full detail, the color filters may be provided on the first substrate SUB1 or on the second substrate SUB2.

The first substrate SUB1 comprises a plurality of gate lines G extending along a first direction D1 and a plurality of source lines S extending along a second direction D2 while crossing the gate lines G. The gate lines G are each drawn to an outer side of the display area DA and connected to the gate driver GD. The source lines S are each drawn to an outer side of the display area DA and connected to the source driver SD. The gate drivers GD and the source drivers SD are connected to the controller CNT. The controller CNT generates control signals based on the video signals and controls the gate driver GD and the source driver SD.

The subpixels PX each comprise a switching element SW, a pixel electrode PE, a common electrode CE and the like. The switching element SW is electrically connected to a respective gate line G and a respective source line S. The switching element SW is formed from a thin film transistor, for example. The pixel electrode PE is electrically connected to the switching element SW. The common electrode CE opposes a plurality of pixel electrodes PE.

Although a detailed explanation of the structure of the display panel PNL is omitted here, in a display mode using a vertical electric field along the normal of the main surface of the substrate or using an inclined electric field at an oblique direction to the normal of the substrate main surface, the pixel electrodes PE are provided on the first substrate SUB1, whereas the common electrode CE is provided on the second substrate SUB2. In a display mode using a lateral electric field along the substrate main surface, both of the pixel electrodes PE and the common electrode CE are provided on the first substrate SUB1. Further, the display panel PNL may have such a structure as to be able to correspond to a display mode using an appropriate combination of the vertical, lateral and inclined electric fields, described above. Note that the main surface of the substrate corresponds to a plane defined by the first direction D1 and the second direction D2.

Figure 3:
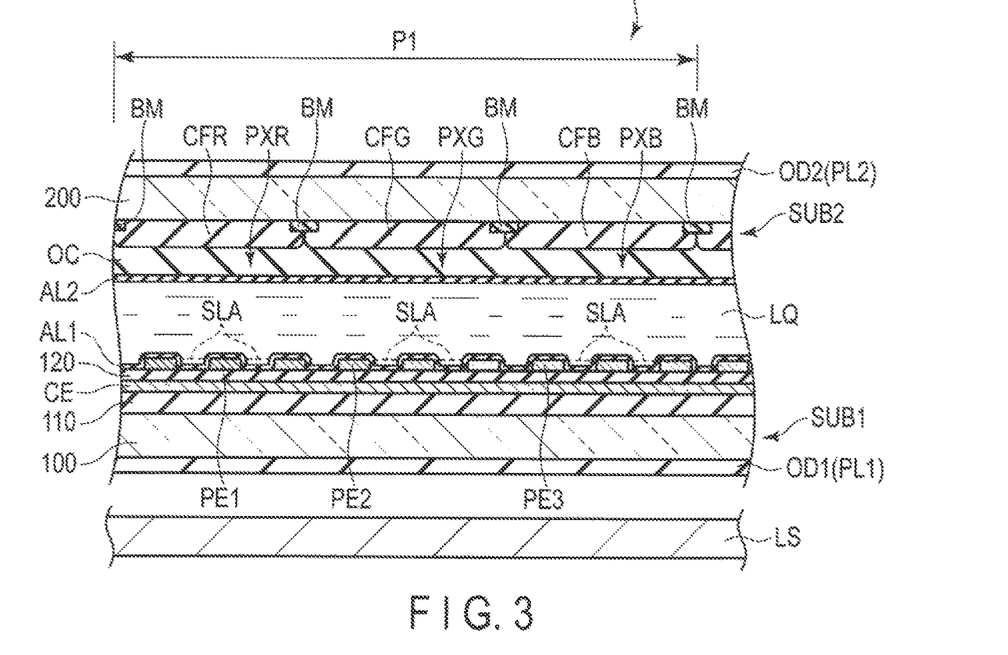
FIG. 3 is a cross section showing a configuration example of the display panel shown in FIG. 2.

FIG. 3 is a cross section showing a configuration example of the display panel PNL shown in FIG. 3. Here, a cross-sectional structure of the display panel PNL to which an fringe field switching (FFS) mode is applied, which is one of the display modes using the lateral electric field, will be briefly described.

The first substrate SUB1 comprises a first insulating substrate 100, a first insulating film 110, a common electrode CE, a second insulating film 120, pixel electrodes PE1 to PE3, a first alignment film AL1 and the like. The common electrode CE extends over the red pixel PXR, the green pixel PXG and the blue pixel PXB. A pixel electrode PE1 of the red pixel PXR, a pixel electrode PE2 of the green pixel PXG and a pixel electrode PE3 of the blue pixel PXB each oppose the common electrode CE, and each comprise slits SLA. In the example illustrated, the common electrode CE is located between the first insulating film 110 and the second insulating film 120, and the pixel electrodes PE1 to PE3 are located between the second insulating film 120 and the first alignment film AL1. Note that the pixel electrodes PE1 to PE3 may be located between the first insulating film 110 and the second insulating film 120 and the common electrode CE may be located between the second insulating film 120 and first alignment film AL1. In this case, the slits SLA are formed in the common electrode CE.

The second substrate SUB2 comprises a second insulating substrate 200, a light-shielding layer BM, color filters CFR, CFG and CFB, an overcoat layer OC, a a second alignment film AL2 and the like. The color filters CFR, CFG and CFB oppose the pixel electrodes PE1, PE2 and PE3, respectively, while interposing the liquid crystal layer LQ between each pair. The color filter CFR is a red filter, the color filter CFG is a green filter and the color filter CFB is a blue filter. In the example illustrated, the color filter CFR, CFG and CFB are provided in the second substrate SUB2, but they may be provided in the first substrate SUB1.

The liquid crystal layer LQ is enclosed between the first alignment film AL1 and the second alignment film AL2.

The light source LS opposes the first substrate SUB1. The light source LS may take various implementable applications, but a detailed explanation of the structure is omitted.

A first optical element OD1 including a first polarizer PL1 is disposed on an external surface of the first insulating substrate 100. A second optical element OD2 including a second polarizer PL2 is disposed on an external surface of the second insulating substrate 200. For example, a first absorption axis of the first polarizer PL1 and a second absorption axis of the second polarizer PL2 are orthogonal to each other.

The pixels each containing a red pixel PXR, a green pixel PXG and a blue pixel PXB are arranged at a pitch P1.

Figure 4:
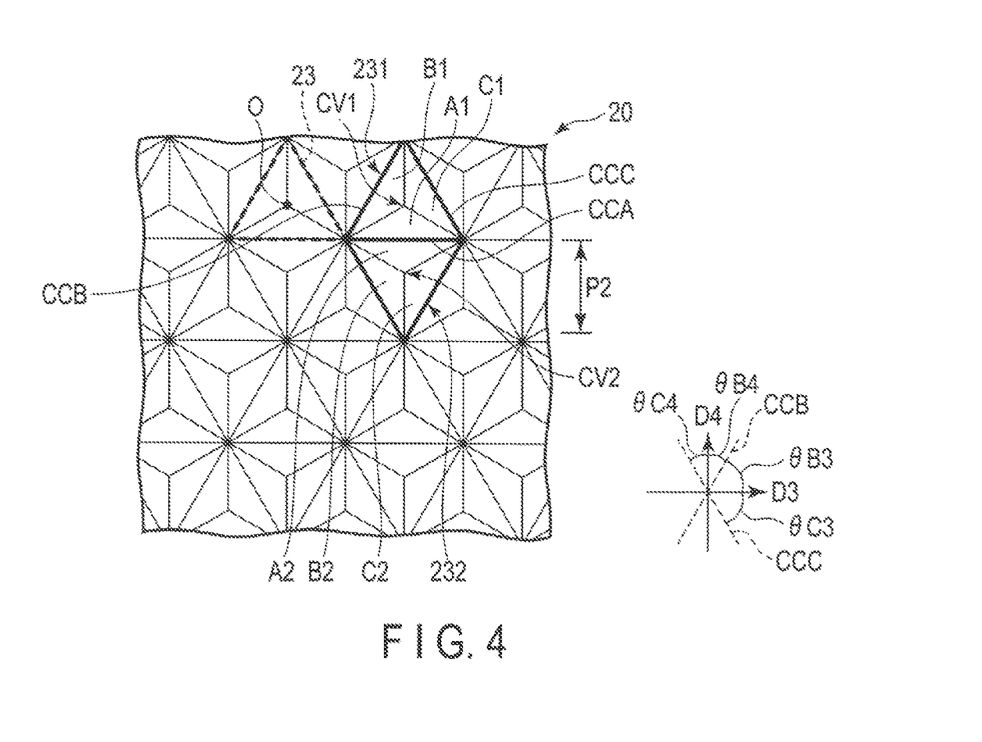
FIG. 4 is a plan view showing a configuration example of a retroreflective element shown in FIG. 1.

FIG. 4 is a plan view showing a configuration example of the retroreflective element 20 shown in FIG. 1. Here, the illustration is shown along a plane defined by a third direction D33 and a fourth direction D44 orthogonal to each other. Moreover, FIG. 4 is a plan view of the retroreflective element 20 shown in FIG. 1 as seen from the rear surface 20B side.

The retroreflective element 20 comprises a plurality of retroreflectors 23. In the illustrated plan view, the retroreflectors 23 each has an outline of an equilateral triangle. Moreover, a center O of the retroreflector 23 projects toward the front side of the sheet, to form each convexity CV of the rear surface 20A shown in FIG. 1. Further, boundaries of adjacent pairs of retroreflector 23 are indicated by dotted lines shown in FIG. 4, and each corresponds to a respective concavity CC of the rear surface 20B shown in FIG. 1. The retroreflectors 23 are arranged along a third direction D3. Further, the retroreflectors 23 are arranged at a pitch P2 along a fourth direction D4. Each adjacent pair of retroreflectors 23 along the third direction D3 and the fourth direction D4 are inversed with respect each other at 180 degrees.

A retroreflector 231 in the figure comprises three reflective surfaces A1, B1 and C1 orthogonal to each other. The retroreflector 231 comprise a convexity CV1 surrounded by reflective surfaces A1, B1 and C1. The retroreflector 231 and a retroreflector 232 are arranged along the fourth direction D4. The retroreflector 232 comprises three reflective surfaces A2, B2 and C2 orthogonal to each other. The retroreflector 231 comprise a convexity CV1 surrounded by the reflective surfaces A1, B1 and C1. An intersection between the reflective surface A1 of the retroreflector 231 and the reflective surface A2 of the retroreflector 232 forms a concavity CCA of the rear surface 20B. The concavity CCA extends along a direction parallel to the third direction D3. The retroreflector 231 and the retroreflector 232 are line-symmetrical to each other with respect to the concavity CCA. Similarly, the boundary between each adjacent pair of retroreflectors 23 corresponds to a concavity. That is, the outline (triangle) of each of the retroreflectors 23 is defined by the concavity. The outline of the retroreflector 231 is defined by concavities CCA, CCB and CCC. The concavities CVB and CVC each extend along a direction crossing the third direction D3 and the fourth direction D4. For example, the extending direction of the concavity CVB makes an angle with the third direction D3 at θB3 of 60 degrees and an angle with the fourth direction D4 at θB4 of 30 degrees. The extending direction of the concavity CCC makes an angle with the third direction D33 at θC3 of 60 degrees and an angle with the fourth direction D4 at θC4 of 30 degrees.

The resolution of the aerial image I1 is dependent on the pitch P2 of the retroreflectors 23. In order to suppress degradation of resolution, the pitch P2 should desirably be less than the pitch P1 of the pixels in the display panel PNL shown in FIG. 3.

Figure 5:
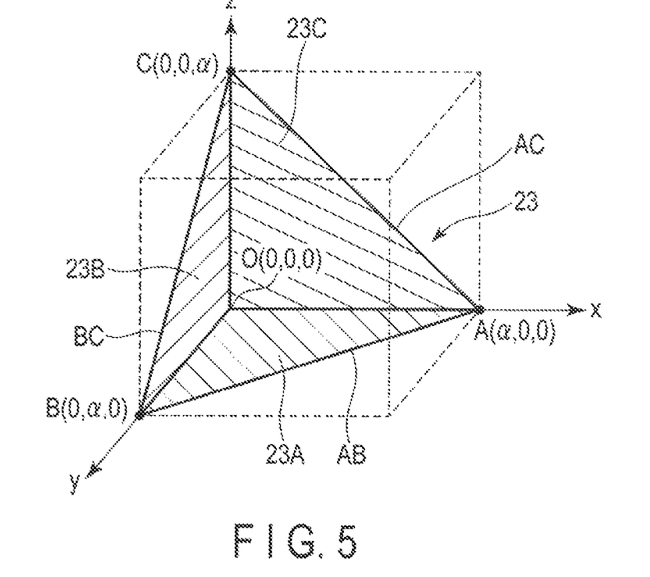
FIG. 5 is a perspective view showing a configuration example of a retroreflector shown in FIG. 4.

FIG. 5 is a perspective view showing a configuration example of a retroreflector 23 shown in FIG. 4. Here, an xyz coordinate system is applied, in which the axes are orthogonal to each other, to illustrate the shape of the retroreflector 23.

More specifically, the retroreflector 23 comprises three reflective surfaces 23A, 23B and 23C in the xyz coordinate system. The reflective surfaces 23A to 23C are all identical in shape and are right-angled isosceles triangles. Further, the reflective surfaces 23A to 23C are arranged to be orthogonal to each other. The retroreflector 23 comprising the reflective surfaces 23A to 23C of such a shape is called a corner cube or a corner reflector or the like.

When a point A on an x-axis is represented by (α, 0, 0), a point B on a y-axis by (0, α, 0) and a point C on a z axis by (0, 0, α), the reflective surface 23A is formed on an x-y plane and is defined by an origin point O, the point A and the point B. The reflective surface 23B is formed on a y-z plane and is defined by the origin point O, the point B and the point C. The reflective surface 23C is formed on an x-z plane and is defined by the origin point O, the point A and the point C. A line segment AB which connects the point A and the point B and a line segment BC which connects the point B and the point C and a line segment AC which connects the point A and the point C correspond to the concavity described above.

The retroreflector 23 can realize retroreflection in which incident light rays are reflected by the three reflective surfaces 23A to 23C, respectively, to reflect them to substantially the same optical paths as those of the incident light rays. A portion where the three reflective surfaces cross orthogonal to each other in the vicinity of the origin O corresponds to the retroreflective unit. Further, each of portions where two reflective surfaces cross orthogonal to each other in the vicinity of a respective one of the three points A, B and C may be a non-retroreflective unit (where the rays are not reflected by the three reflective surfaces).

Figure 6:
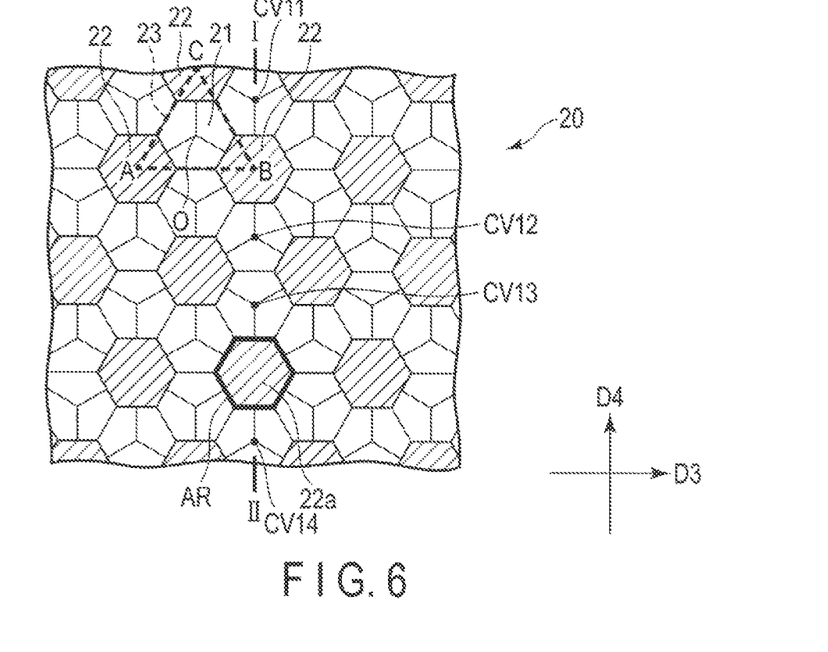
FIG. 6 is a plan view illustrating a retroreflective unit and a non-retroreflective unit in the retroreflective element.

FIG. 6 is a plan view illustrated to describe the retroreflective unit 21 and the non-retroreflective unit 22 in the retroreflective element 20. For example, when focusing on one retroreflector 23 enclosed with the dotted lines in the figure, the retroreflective unit 21 corresponds to a hexagonal region formed near the origin O, and the non-retroreflective unit 22 corresponds to triangular regions each formed near a respective one of three corner portions A, B and C of the retroreflector 23. When focusing on one non-retroreflective unit 22 indicated with slash lines in the figure, it is formed into a hexagonal shape adjacent to six retroreflectors 23, in which non-retroreflective units of these retroreflectors 23 aggregate, in a plane defined by the third direction D3 and the fourth direction D4. Note that the retroreflective unit 21 and the non-retroreflective unit 22 of a right hexagon such as shown in FIG. 6 appear when, for example, the retroreflector 23 has an equilateral triangular shape such as that illustrated, when the retroreflective element 20 is viewed from the normal direction of the surface 20A shown in FIG. 1 in plan view.

In one non-retroreflective unit, the display light reflects once or twice, or even four times or more. Thus, the non-retroreflective unit 22 does not reflect display light three times, and therefore the display light scatters without retroreflecting.

If the reflection light by this non-retroreflective unit 22 passes through the optical element 10, the display quality of the aerial image I1 may be badly affected undesirably. That is, the lights entering the non-retroreflective unit 22 scatters, which may cause degradation in display quality without contributing to the formation of the aerial image I1.

Figure 7:
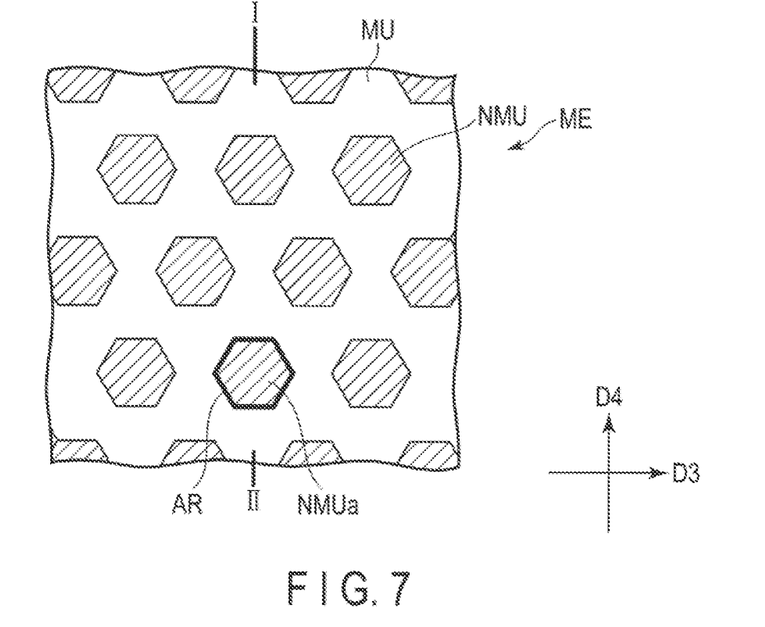
FIG. 7 is a plan view showing a configuration example of a modulating element shown in FIG. 1.

FIG. 7 is a plan view showing a configuration example of the retroreflective element 20 shown in FIG. 1.

The modulating element ME includes the modulating unit MU and the non-modulating unit NMU. The non-modulating unit NMU is formed into a hexagonal shape in a plane defined by the third direction D3 and the fourth direction D4. Further, the position of an area AR shown in FIG. 7 is equal to the position of an area AR shown in FIG. 6, and the non-retroreflective unit 22a shown in FIG. 6 and the non-modulating unit NMUa shown in FIG. 7 are located in the same area AR. That is, in this embodiment, a non-retroreflective unit 22a overlaps a non-modulating unit NMUa. Similarly, other non-retroreflective units 22 overlap other non-modulating units NMU, respectively. Further, similarly, the retroreflective units 21 overlap the modulating units MU, respectively. Here, it is preferable that the shape of the non-modulating units NMU accord with that of the non-retroreflective units 22. For example, when the non-retroreflective units 22 are shaped into a regular hexagon, the non-modulating units NMU are formed into a regular hexagon of the same size as that of the non-retroreflective units 22.

Figure 8:
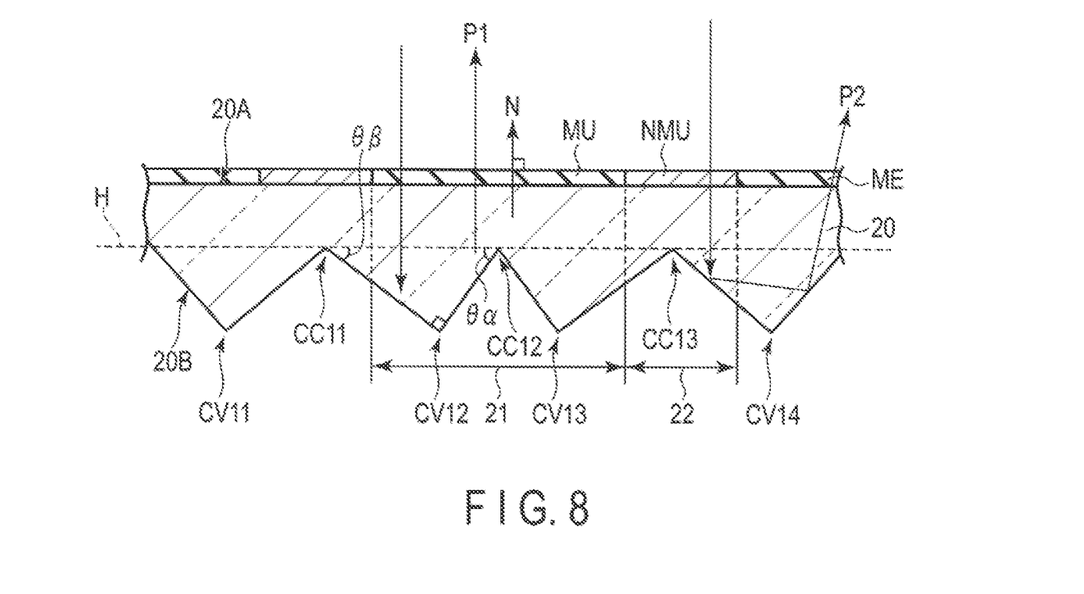
FIG. 8 is a cross section showing the structure of the retroreflective element and modulating element cut along line A-B shown in FIGS. 6 and 7.

FIG. 8 is a cross section showing a structure of each of the retroreflective element 20 and the modulating element ME cut along line I-II shown in FIGS. 6 and 7.

The retroreflective element 20 includes the surface 20A opposing the modulating element ME and the surface 20A is a flat surface. Further, the element 20 further comprises the retroreflective unit 21 and the non-retroreflective unit 22 in the surface 20A. In the example illustrated, the modulating elements ME are fixed to the surface 20A.

The rear surface 20B comprises convexities CV11 to CV14 and concavities CC11 to CC13 respectively located between adjacent convexities. The convexities CV11 to CV14 overlap the modulating units MU, respectively, in the normal direction N of the surface 20A. The concavities CC11 and CC13 overlap the non-modulating units NMU, respectively, in the normal direction N of the surface 20A. The concavity CC12 overlaps the respective modulating unit MU in the normal direction N of the surface 20A. In the example illustrated, a region including the convexities CV12 and CV13 and the concavity CC12 corresponds to the retroreflective unit 21, and a region including the concavity CC13 between the convexities CV13 and CV14 corresponds to the non-retroreflective unit 22. When focusing on one convexity CV11, it is observed that a section formed by a horizontal surface H and the rear surface 20B is a right triangle, and the horizontal surface H corresponds to a hypotenuse. Each of angles θα and angle θβ made by the horizontal surface H and the rear surface 20B is an acute angle and the angle θβ is less than the angle θα.

As the modulating elements ME, for example, a retardation film, or a liquid crystal panel in which a liquid crystal layer is disposed between two electrodes, or the like is applicable. In the case where the modulating elements ME are a retardation film which imparts a predetermined phase difference in its entire region, the non-modulating units NMU respectively correspond to openings penetrating the retardation film. The modulating elements ME may be a retardation film containing liquid crystal molecules. Such a retardation film can form locally regions where the alignment state of liquid crystal molecules differ from one another, and can comprise a region which imparts a predetermined phase difference (modulation portion) and a region which does not impart a phase difference (modulation portion). In this case, the non-modulation portion may not be an opening. On the other hand, in the case where the modulating elements ME are a liquid crystal panel, regions where different voltages are applied to the liquid crystal layer are formed locally and thus regions where the alignment state of liquid crystal molecules differ from one another can be formed. Thus, the modulating units MU which impart a phase difference and the non-modulating units NMU which do not impart a phase difference can be formed according to the alignment state of liquid crystal molecules.

In the case where the modulating element ME is a retardation film, the retardation film may be adhered to the surface 20A, or the retardation film may be directly formed as a film on the surface 20A.

Figure 9:
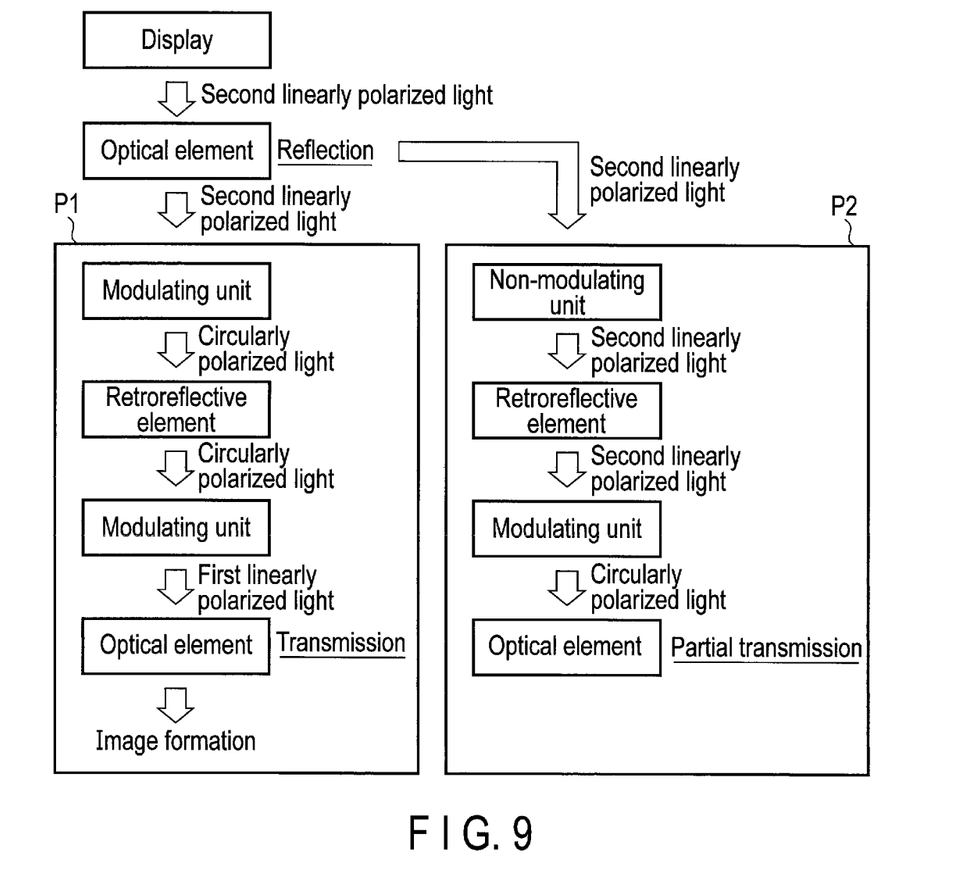
FIG. 9 is a diagram illustrating the function of each structure member of the display device.

FIG. 9 is a diagram illustrating the function of each structural member of the display device 1. Here, with reference to FIGS. 1 and 8, optical paths of display light emitted from the display DSP will be described.

The display DSP emits the second linearly polarized light corresponding to the display light of the display image I0. Here, the second linearly polarized light has a polarization plane which crosses the transmission axis of the optical element 10, and corresponds to the linearly polarized light reflected by the optical element 10.

First, an optical path P1 will be described. The optical path P1 indicates an optical path of light when the display image I0 displayed in the display DSP is imaged as the aerial image I1.

The second linearly polarized light reflected in the optical element 10 passes through the modulating unit MU and is converted into circularly polarized light. In this embodiment, the term "circularly polarized light" also includes elliptically polarized light. The circularly polarized light enters the retroreflective element 20, and is reflected three times in the reflective surfaces 23A to 23C such as shown in FIG. 5. That is, in the optical path P1, the circularly polarized light entering the retroreflective element 20 is retroreflected by the retroreflective unit 21. The reflection light thus retroreflected is circularly polarized light. Then, the circularly polarized light once again passes through the modulating unit MU, and is converted into the first linearly polarized light. The first linearly polarized light passes through the optical element 10, and is imaged as the aerial image I1 representing the display image I0. The observer can observe the aerial image I1 floating in the air from a direction opposite to the traveling direction of the first linearly polarized light having passed through the optical element 10.

Next, an optical path P2 will be described. The optical path P2 indicates an optical path in which display light emitted from the display DSP reaches the non-retroreflective unit 22 and scatters.

The second linearly polarized light reflected in the optical element 10 passes through the non-modulating unit NMU without being modulated. The second linearly polarized light having passed the non-modulating unit NMU enters the retroreflective element 20, and is reflected in the non-retroreflective unit 22. At this time, the second linearly polarized light is scattered in the non-retroreflective unit 22, but not retroreflected. Then, if the second linearly polarized light passes through the modulating unit MU, it is converted into circularly polarized light. Of the circularly polarized light, those components which correspond to the first linearly polarized light passes through the optical element 10, and those corresponding to the second linearly polarized light are reflected by the optical element 10.

As indicated by the optical path P2, the light entering the non-modulating unit NMU may pass through the modulating unit MU or the non-modulating unit NMU after being reflected in the non-retroreflective unit 22, as illustrated. The light scattered by the non-retroreflective unit 22 and passing through the non-modulating unit NMU is maintained as the second linearly polarized light without being converted, and therefore it cannot pass through the optical element 10.

According to this embodiment, the display device 1 comprises the modulating elements ME arranged on a surface 20A side of the retroreflective element 20. Further, the modulating element ME comprises the modulating units MU which overlap the retroreflective units 21, respectively and the non-modulating units NMU which overlap the non-retroreflective units 22, respectively. With this structure, of the display light reflected by the optical element 10, the second linearly polarized light having passes the modulating unit MU is retroreflected in the retroreflective unit 21 to be converted into the first linearly polarized light, which further passes through the optical element 10. On the other hand, of the display light reflected by the optical element 10, the second linearly polarized light having passes through the non-modulating unit NMU is not entirely converted into the first linearly polarized light, thereby making it possible to partially suppress the light scattered in the non-retroreflective unit 22 in the optical element 10 from passing through. Therefore, it becomes possible to suppress degradation of the display quality of the aerial image I1, which may be caused by stray light reaching a different location from that of the aerial image.

This embodiment is described in connection with the case where the retroreflector 23 is equilateral triangular in plan view, and the non-retroreflective unit 22 is right hexagonal, but the shape of the retroreflectors is not limited to this. If the retroreflectors are of some other shape, an advantageous effect similar to that of this embodiment can be obtained as long as the modulation portions and the non-modulation portions are arranged to overlap the retroreflective units and the non-retroreflective units, respectively.

Next, an example of the embodiment will be described. Here, the same structural members as those of the above-described embodiment will be denoted by the reference symbols, and the detailed explanations therefor will be omitted.

Figure 10:
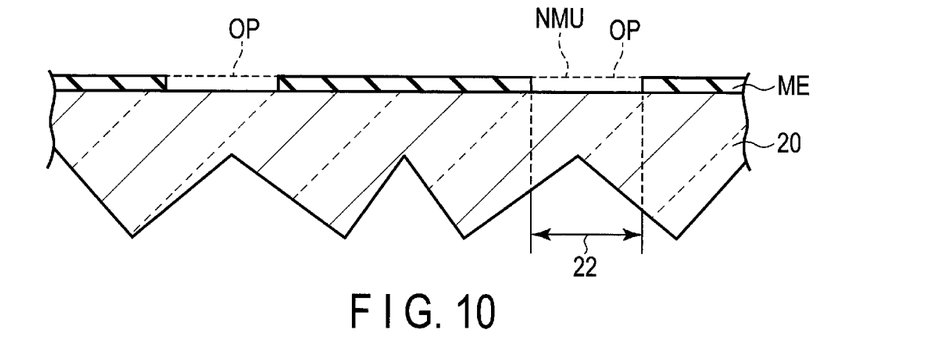
FIG. 10 is a diagram showing an example of the modulating element according to this embodiment.

FIG. 10 is a diagram showing an example of the modulating element ME according to this embodiment.

In the example illustrated, the modulating elements ME are each a retardation film. The modulating elements ME each comprise an opening OP. The non-modulating units NMU correspond to the openings OP. The openings OP are formed in positions which overlap the non-retroreflective units 22, respectively.

With such an example as described above, an advantageous effect similar to that of this embodiment can be obtained.

Figure 11:
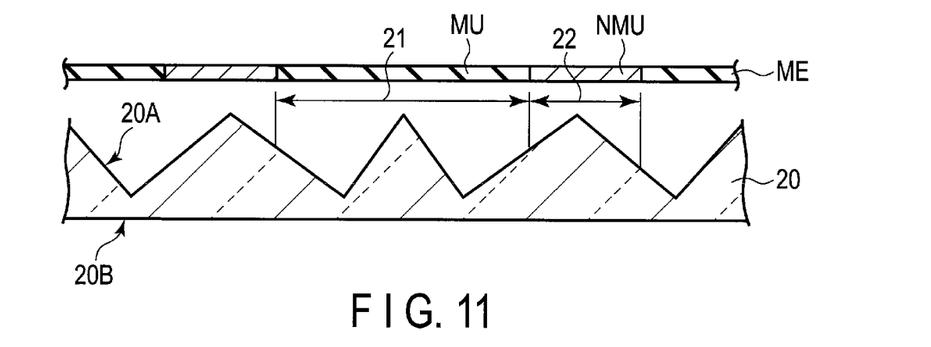
FIG. 11 is a diagram showing an example of the retroreflective element and the modulating element of this embodiment.

FIG. 11 is a diagram showing an example of each of the retroreflective element 20 and the modulating element ME according to this embodiment.

The example shown in FIG. 11 is different from that illustrated in FIG. 8 in structure that the surface 20A of the retroreflective element 20 comprises the retroreflective units 21 and the non-retroreflective units 22. The modulating elements ME are spaced from the retroreflective units 21 and the non-retroreflective units 22 of the surface 20A. The rear surface 20B is flat. Note that a reflective film may be formed in the surface 20A of the retroreflective element 20 having such a configuration as shown in FIG. 11.

With such an example as described above, an advantageous effect similar to that of this embodiment can be obtained.

Figure 12:
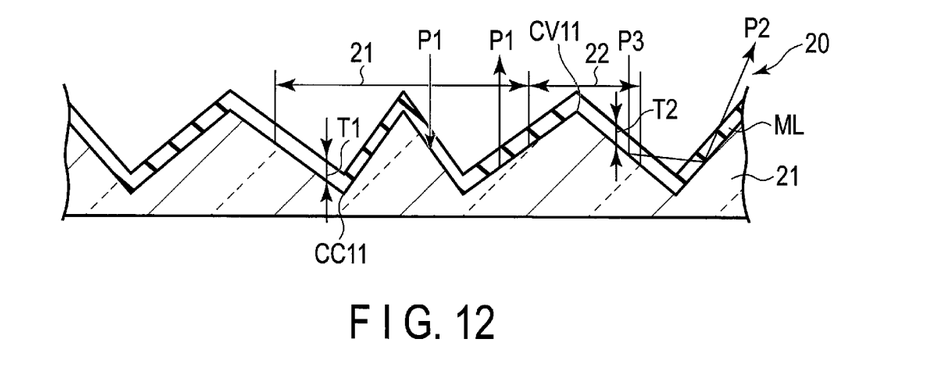
FIG. 12 is a diagram showing a modification of this embodiment.

FIG. 12 is a diagram showing a modification of this embodiment. The modification shown in FIG. 12 is different from that shown in FIG. 11 in that a modulating layer ML is formed on the surface 20A in place of the modulating elements ME.

The modulating layer ML is disposed to overlap the retroreflective units 21 and the non-retroreflective units 22. As described with reference to FIGS. 4 to 6, the retroreflective units 21 and the non-retroreflective units 22 are each included in a respective retroreflector 23 comprising three reflective surfaces orthogonal to each other. The modulating layer ML covers the retroreflector 23 and is disposed entirely on the three reflective surfaces. Such a modulating layer ML imparts, for example, a phase difference of about $\lambda/4$ to transmitted light. Although the detailed explanation thereof is omitted, the modulating layer ML is disposed such that a slow axis thereof crosses at an angle of 45° with respect to the polarization plane of the linearly polarized light.

For example, such a modulating layer ML can be formed by carrying out spin coat on the surface 20A. Here, for example, if the phase difference of the modulating layer ML is dependent on the thickness of the film, it is preferable that the thickness of the portion of the film, which overlaps the retroreflective unit 21 be substantially constant and the phase difference be λ/4. When the modulating layer ML disposed on the concavities CC11 of the retroreflective unit 21 has a thickness T1, the modulating layer ML disposed on the convexities CV11 of the non-retroreflective unit 22 should preferably have a thickness T2, which is different from the thickness T1, and, for example, the thickness T2 is less than the thickness T1. Further, if the modulating layer ML can be patterned into a desired shape, only the regions overlapping the non-retroreflective units 22 may be removed.

Figure 13:
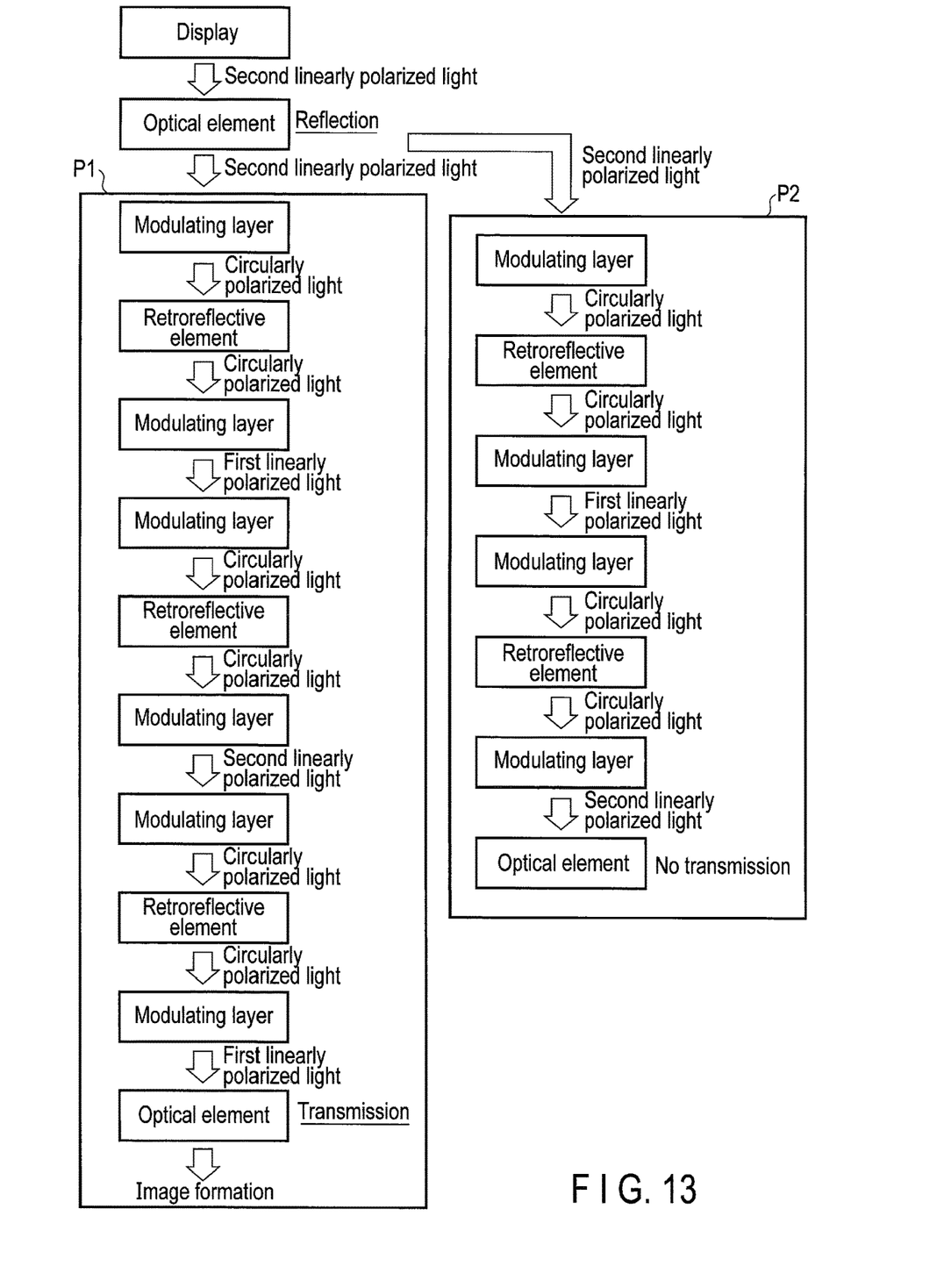
FIG. 13 is a diagram illustrating the function of each structural member of the display device when the retroreflective element and a modulating layer shown in FIG. 12.

FIG. 13 is a diagram illustrating the function of each structural member of the display device 1 when the retroreflective element 20 and the modulating layer ML shown in FIG. 12. Here, with reference to FIGS. 1 and 12, optical paths of display light emitted from the display DSP will be described.

The display DSP emits the second linearly polarized light corresponding to the display light of the display image I0. Here, the second linearly polarized light has a polarization plane which crosses the transmission axis of the optical element 10, and corresponds to the linearly polarized light reflected by the optical element 10.

First, an optical path P1 will be described. The optical path P1 indicates an optical path of light when the display image I0 displayed in the display DSP is imaged as the aerial image I1.

The second linearly polarized light reflected in the optical element 10 passes through the modulating layer ML and is converted into circularly polarized light. The circularly polarized light is reflected by the retroreflective element 20, and enters the modulating layer ML once again to be converted into the circularly polarized light, which is then reflected by the retroreflective element 20. Then, the light passes through the modulating layer ML to be converted into the second linearly polarized light. The second linearly polarized light passes through the modulating layer ML to be converted into circularly polarized light, and then is reflected by the retroreflective element 20. Then, the light passes through the modulating layer ML to be converted into the first linearly polarized light. Thus, the display light is reflected three times by the reflective surfaces 23A to 23C in the retroreflective element 20 as shown in FIG. 5. That is, in the optical path P1, the circularly polarized light entering the retroreflective element 20 is retroreflected by the retroreflective unit 21. The first linearly polarized light passes through the optical element 10, and is imaged as the aerial image I1 representing the display image I0. The observer can observe the aerial image I1 floating in the air from a direction opposite to the traveling direction of the first linearly polarized light having passed the optical element 10.

Next, an optical path P2 will be described. The optical path P2 indicates an optical path in which the display light emitted from the display DSP reaches the non-retroreflective unit 22 and scatters.

The second linearly polarized light reflected in the optical element 10 passes through the modulating layer ML, and is converted into circularly polarized light. The circularly polarized light is reflected by the retroreflective element 20, and passes through the modulating layer ML once again to be converted into the first linearly polarized light. The first linearly polarized light passes through the modulating layer ML to be converted into circularly polarized light, and then is reflected by the retroreflective element 20. The light passes through the modulating layer ML to be converted into the second linearly polarized light. The second linearly polarized light does not pass through the optical element 10. In the illustrated example, the light entering the non-retroreflective unit 22 is reflected two times and cannot pass through the optical element 10.

The example illustrated is directed to the case where light entering the non-retroreflective unit 22 is reflected two times, but the light entering the non-retroreflective unit 22 may be reflected once, two times or four times or more. As shown in FIG. 13, the light entering the non-retroreflective unit 22 and reflected an even number of times is converted into the second linearly polarized light by the modulating layer ML, thereby making it possible to suppress the light from passing through the optical element 10.

With such an example as described above, an advantageous effect similar to that of this embodiment can be obtained.

As described above, according to the embodiment, a display device which can suppress degradation of the display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    an optical element comprising a transmission axis which transmits first linearly polarized light and reflecting second linearly polarized light which crosses the transmission axis,
    a display unit which emits display light of the second linearly polarized light towards the optical element;
    a retroreflective element comprising a retroreflective unit which retroreflects reflection light reflected by the optical element, and a non-retroreflective unit which does not retroreflect reflection light reflected by the optical element;
    a retarder element comprising a first region disposed in a position which overlaps the retroreflective unit, and a second region disposed in a position which overlaps the non-retroreflective unit, wherein
    the retarder element comprises a retardation film,
    the second region is an opening through the retardation film of the retarder element.

2. The device of claim 1, wherein
    the retroreflective element comprises a flat surface which opposes the retarder element,
    the retroreflective unit and the non-retroreflective unit are located on an opposite side to the flat surface, and
    the retarder element is fixed to the flat surface.

3. The device of claim 1, wherein
    the retroreflective element comprises a plurality of retroreflectors, and the retroreflectors each comprises three reflective surfaces orthogonal to each other.

4. The device of claim 1, wherein
the second region is hexagonal in plan view.

5. The device of claim 1, wherein
the first region imparts a phase difference of a quarter wave to transmitted light.

6. The device of claim 5, wherein
the opening is a hexagon.

7. The device of claim 1, wherein
the display unit comprises a first substrate, a second substrate which opposes the first substrate, and a liquid crystal layer held between the first substrate and the second substrate.

8. The device of claim 1, wherein
the retroreflective element comprises a flat surface located on an opposite side to the retroreflective unit and the non-retroreflective unit, and
the retroreflective unit and the non-retroreflective unit are located between the flat surface and the retarder element.

9. The device of claim 8, wherein
the retarder element is spaced from the retroreflective unit and the non-retroreflective unit.

10. The device of claim 1, wherein
a phase difference in the second region of the film is substantially zero.

11. The device of claim 10, wherein
the second region is a hexagon.

* * * * *